United States Patent
Shin et al.

(10) Patent No.: US 9,958,718 B2
(45) Date of Patent: May 1, 2018

(54) DISPLAY DEVICE

(71) Applicant: LG Display Co., Ltd., Seoul (KR)

(72) Inventors: Sung-Eui Shin, Paju-si (KR); JeongJo Lee, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 15/211,778

(22) Filed: Jul. 15, 2016

(65) Prior Publication Data

US 2017/0017108 A1    Jan. 19, 2017

(30) Foreign Application Priority Data

Jul. 17, 2015    (KR) ........................ 10-2015-0101660

(51) Int. Cl.

| | | |
|---|---|---|
| *G02F 1/1333* | (2006.01) | |
| *G02F 1/1335* | (2006.01) | |
| *G02F 1/1345* | (2006.01) | |
| *G09G 3/34* | (2006.01) | |

(52) U.S. Cl.
CPC .... *G02F 1/133308* (2013.01); *G02F 1/13452* (2013.01); *G02F 1/13458* (2013.01); *G02F 1/133615* (2013.01); *G09G 3/3406* (2013.01); *G02F 2001/133314* (2013.01); *G09G 2300/026* (2013.01); *G09G 2300/0426* (2013.01)

(58) Field of Classification Search
CPC ......... G02F 1/133308; G02F 1/133345; G02F 1/133524; G02F 1/133528; G02F 1/1343; G02F 1/134309; G02F 1/133615; G02F 1/133603; G02F 1/133608; G02F 1/1345; G02F 1/13452; G02F 1/133; G02F 1/1333; G02F 1/133305; G02F 1/13458; G02F 2001/133317; G02F 2001/133314; G02F 2001/13332; G02F 2001/133322; G02F 2001/133311; G02F 2001/133388; G02F 2201/46; G02F 2201/503; G02F 2201/50; G02F 2202/28; G02B 6/0028; G02B 6/0073; G02B 6/0091; G02B 6/0011; G02B 6/0093; G02B 6/0095; H05K 2201/10106; H05K 5/04; H05K 7/02; H05K 7/14; G06F 1/1601; G06F 1/16; G06F 1/1603
USPC ... 349/58, 65, 122, 149, 150, 151, 152, 138, 349/139; 361/730, 748, 752; 362/97.1, 362/610, 611, 612, 616, 382, 615, 631, 362/632, 633, 634, 97.2
See application file for complete search history.

(56) References Cited

U.S. PATENT DOCUMENTS

| | | | | |
|---|---|---|---|---|
| 2013/0058020 | A1* | 3/2013 | Jo | ........................ G02F 1/1345 361/679.01 |
| 2015/0253613 | A1* | 9/2015 | Yoon | .................... G02F 1/13452 349/58 |
| 2015/0286087 | A1* | 10/2015 | Kim | .................. G02F 1/133308 349/58 |
| 2017/0151706 | A1* | 6/2017 | Iwata | ..................... B29C 59/16 |

* cited by examiner

*Primary Examiner* — Thoi Duong
(74) *Attorney, Agent, or Firm* — Birch, Stewart, Kolasch & Birch, LLP

(57) ABSTRACT

Disclosed is a display device including a display panel; a panel driver electrically connected to the display panel, a guide frame arranged at an edge area of the display panel and configured to support the display panel; and a coupling member arranged on an upper surface of the support and configured to couple the display panel to the guide frame.

18 Claims, 8 Drawing Sheets

DISPLAY DEVICE

CROSS REFERENCE TO RELATED APPLICATIONS

This application claims the benefit of the Korean Patent Application No. 10-2015-0101660 filed on Jul. 17, 2015, which is hereby incorporated by reference for all purposes as if fully set forth herein.

BACKGROUND OF THE INVENTION

Field of the Invention

The present invention relates to a display device, and more particularly, to a thin display device with an improved esthetic sense.

Discussion of the Related Art

Recently, display devices that are replacements for early types of display devices, such as a cathode ray tube, a liquid crystal display device, a plasma display panel, an organic light emitting display device, etc. have been developed. Such display devices have increased in size while their weights and volumes have reduced, and their studies and developments have been continuously made in view of response speed and picture quality, whereby many advances in quality have been made.

In addition to the studies and developments in view of the above technical aspect, studies and developments in view of a product design that may appeal to consumers have been made recently. As an example, improved esthetic designs, which encourage a purchase by minimizing a thickness of a display device and at the same time appealing to a consumer's esthetic sense, have been continuously developed.

However, the related art display device has a limitation in minimizing a thickness and improving an esthetic sense due to its structural property. Hereinafter, the limitation of the related art display device will be described in more detail with reference to FIG. 1. In particular, FIG. 1 is a partial cross-sectional view illustrating a related art display device.

As illustrated in FIG. 1, the related art display device includes a display panel 10, a panel driver 20, and a case 30. The display panel 10 includes a lower substrate 12 and an upper substrate 14. Gate lines and data lines are also formed on the lower substrate 12 to define pixel areas, where the gate lines cross the data lines. In addition, a thin film transistor is formed in each area where the gate lines cross the data lines, and a pixel electrode connected with the thin film transistor is formed in the pixel area.

The upper substrate 14 is formed on the lower substrate 12. In order to apply signals to the gate lines and the data lines formed on the lower substrate 12, a periphery area at one side of the lower substrate 12 is exposed to the outside, such that the upper substrate 14 is not formed in the periphery area at one side of the lower substrate 12.

The panel driver 20 is formed in the exposed periphery area at one side of the lower substrate 12 to apply signals to the gate lines and the data lines, and the case 30 is formed to cover a periphery area of the display panel 10. As described above, because the panel driver 20 is formed in the periphery area at one side of the lower substrate 12, the panel driver 20 should be prevented from being exposed to the outside. The case 30 is used to prevent this exposure.

In this way, to prevent the panel driver 20 from being exposed, the case 30 is formed to cover the periphery area of the display panel 10. In view of a structural property of the case 30, the case 30 is formed above the upper substrate 14. However, using the case 30 in this manner causes problems as follows.

First of all, because the case 30 is formed above the upper substrate 14, a thickness of the display device is increased correspondingly. Also, because the case 30 is extended more than the upper substrate 14, a step difference occurs in a front surface of the display device, whereby an esthetic sense is deteriorated. Also, because the case 30 should prevent the panel driver 20 from being exposed, the case 30 has a minimum required bezel. For this reason, an esthetic sense of the display device is deteriorated.

SUMMARY OF THE INVENTION

Accordingly, the present invention is directed to a display device that substantially solves one or more problems due to limitations and disadvantages of the related art. An advantage of the present invention is to provide a display device which is thin and has an improved esthetic sense.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure described below as well as the appended drawings.

To achieve these objects and other advantages and in accordance with the purpose of the invention, as embodied and broadly described herein, a display device according to an embodiment of the present invention includes a display panel, a panel driver electrically connected to the display panel, a guide frame arranged at an edge area of the display panel and configured to support the display panel, and a coupling member arranged on an upper surface of the support and configured to couple the display panel to the guide frame.

It is to be understood that both the foregoing general description and the following detailed description of the present invention are provided as examples and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description explain the principle of the invention. In the drawings.

DETAILED DESCRIPTION OF THE EMBODIMENTS

Terms disclosed in this specification should be understood as follows. The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a display device according to an embodiment of the present invention will be described in detail with reference to the accompanying drawings. The display device of the embodiment of the present invention may be realized based on flat panel display devices such as a liquid crystal display (LCD) device, a field emission display (FED) device, a plasma display panel (PDP), an organic light emitting display (OLED) device, an electrophoresis display (EPD) device, etc.

Figure 1:
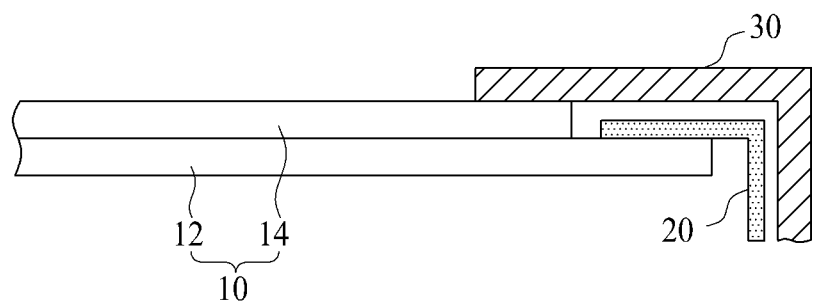
FIG. 1 is a partial cross-sectional view illustrating a related art display device.
Figure 2:
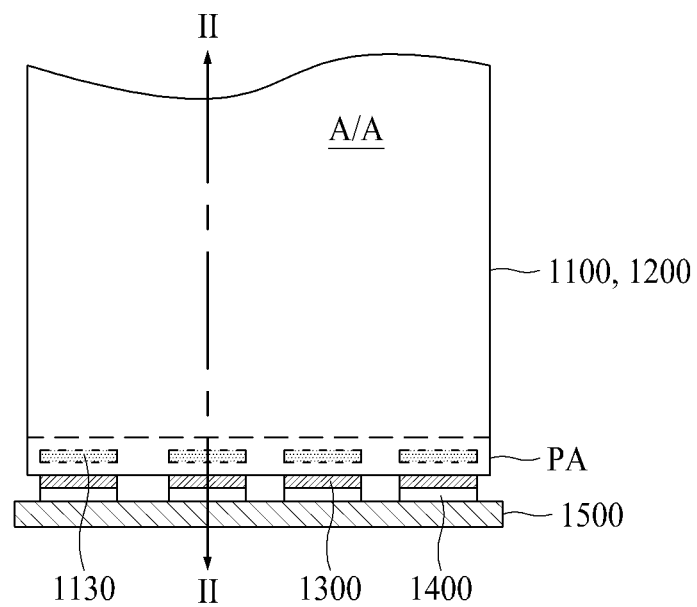
FIG. 2 is a plane view illustrating a display device according to an embodiment of the present invention.
Figure 3A:
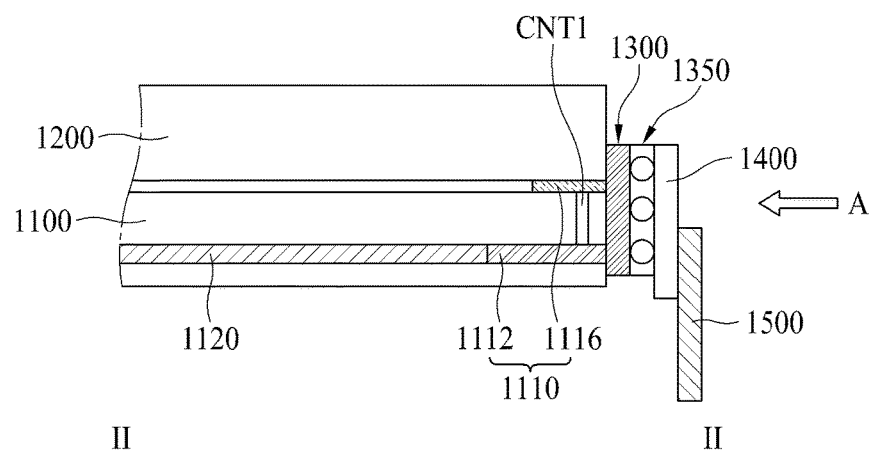
FIG. 3A is a diagram illustrating an edge side bonding contact structure taken along line of II-II of FIG. 2.

FIG. 2 is a plane view illustrating a display device. FIG. 3A is a diagram illustrating an edge side bonding contact structure taken along line of II-II of FIG. 2 and FIG. 3B is a view illustrating an edge side bonding contact structure viewed in a direction A of FIG. 3A according to an embodiment of the present invention.

Figure 3B:
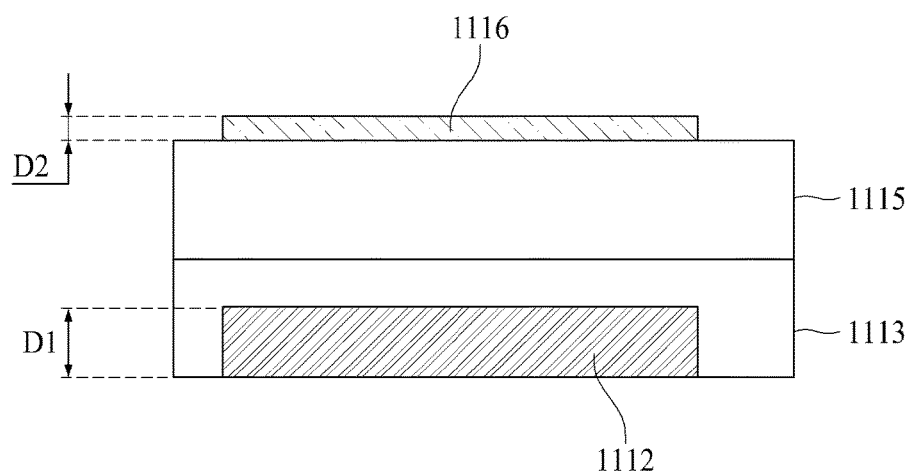
FIG. 3B is a diagram illustrating an edge side bonding contact structure viewed in a direction A of FIG. 3A.

Referring to FIGS. 2, 3A and 3B, the display device according to an embodiment of the present invention includes a first substrate 1100, a second substrate 1200, a flexible circuit film 1400, and a printed circuit board (PCB) 1500. The first substrate 1100 and the second substrate 1200 are bonded to each other to constitute a display panel, and the flexible circuit film 1400 and the printed circuit board 1500 constitute a panel driver.

The display panel includes an active area A/A where an image is displayed, and a pad area PA corresponding to a non-display area and the pad area PA is arranged outside the active area A/A. Signal pads 1110 are arranged in the pad area PA, and each signal pad has a multi-layer structure. Also, a contact portion 1130 for electrically connecting multi-layers of the respective signal pads 1110 is arranged in the pad area PA.

The flexible circuit film 1400 is attached to an edge side of the display panel, which is a side of the display panel that does not include a display area, and the printed circuit board 1500 is connected to the flexible circuit film 1400. Further, the first substrate 1100 and the second substrate 1200 have the same patterns as each other. The first substrate 1100 and the second substrate 1200 may have the same sized quadrangles as each other. That is, according to an embodiment of the present invention, one end of the first substrate 1100 is matched with one end of the second substrate 1200 in an area to which the flexible circuit film 1400 is attached.

The flexible circuit film 1400 is attached to the edge side of the display panel without being attached to an upper surface of the first substrate 1100. Although the drawing illustrates that one flexible circuit film 1400 and one printed circuit board 1500 are connected to one edge side of the display panel, for example, a lower edge side of the display panel, one flexible circuit film 1400 and one printed circuit board 1500 may additionally be connected to the other edge side of the display panel, for example, an upper end of the display panel.

Referring to FIG. 3A, the first substrate 1100 and the second substrate 1200 face each other, and have the same lengths. Also, one end of the first substrate 1100 is matched with one end of the second substrate 1200, and the other end of the first substrate 1100 is matched with the other end of the second substrate 1200. Details of the first substrate 1100 and the second substrate 1200 may be varied depending on the display device applied thereto.

For example, if the display device according to an embodiment of the present invention is applied to a liquid crystal display device, a thin film transistor and a pixel electrode may be formed on the first substrate 1100, and a black matrix and a color filter may be formed on the second substrate 1200. In this instance, a liquid crystal layer is formed between the first substrate 1100 and the second substrate 1200.

The display panel according to an embodiment of the present invention may be provided in various modes, such as a Twisted Nematic (TN) mode, an In-Plane Switching (IPS) mode, a Vertical Alignment (VA) mode, or a Fringe Field Switching (FFS) mode. In addition, various modifications can be made in the first substrate 1100 and the second substrate 1200 depending on the various modes of the display panel.

Further, if the display device according to an embodiment of the present invention is applied to an organic light emitting display device, an organic light emitting diode, which includes a thin film transistor, an anode, a light emitting layer and a cathode, may be formed on the first substrate 1100. The second substrate 1200 may be formed of, but not limited to, an encapsulation substrate. Various modifications may be made in the second substrate 1200. Also, either or both the first substrate 1100 and the second substrate 1200 may be flexible substrates, such that they can be bent into a curved shape.

Referring again to FIGS. 3A and 3B, a line 1120 is formed on the first substrate 1100, and the signal pad 1110 is connected to an end of the line 1120. The line 1120 may be a signal line such as a gate line, a data line, or a common voltage line. As another example, the line 1120 may be a non-signal line such as an electrostatic discharge line.

Further, each of the signal pads 1110 is formed in a multi-layer structure. In more detail, the signal pad includes a first line 1112 and a second line 1116. Also, a first insulating film 1113 and a second insulating film 1115 are arranged between the first line 1112 and the second line 1116. In this instance, a gate insulating film of an inorganic material (for example, oxide silicon or nitride silicon) may be used as the first insulating film 1113, and a passivation film of an organic material (for example, photoacryl) may be used as the second insulating film 1115.

The first line 1112 may be arranged on the same layer as the gate line arranged in the active area A/A. The first line 1112 may have a thickness D1 of 400 nm to 500 nm, and the second line 1116 may have a thickness D2 of 20 nm to 40 nm. The first line 1112 and the second line 1116 are electrically connected with each other through a first contact hole CNT1.

Further, the line 1120 and the signal pad 1110 are electrically connected with each other. For example, as shown in FIG. 3A, the line 1120 may be arranged on the same layer as the first line 1112 of the signal pad 1110 and may be connected with the first line 1112 in one body.

Although one line constituting the signal pad 1110 is formed on the same layer as the line 1120 in one body as shown, the present invention is not limited to this. For example, the line 1120 may be a data line provided on the gate insulating film, and the signal pad 1110 may be a data pad provided below the gate insulating film. In this instance, the data pad may be connected with the data line through a contact hole provided in the gate insulating film.

One end of the first substrate 1100 is matched with one end of the second substrate 1200 in the area where the signal pad 1110 is formed. Therefore, the flexible circuit film 1400 is electrically connected to one edge side of the signal pad 1110 unlike the related art in which the flexible circuit film 1400 is connected to the upper surface of the signal pad 1110.

However, because one edge side of the signal pad, which is connected to the flexible circuit film 1400, has a width relatively smaller than the upper surface of the signal pad, a connection property between the signal pad 1110 and the flexible circuit film 1400 may be deteriorated. To improve the connection property between the signal pad 1110 and the flexible circuit film 1400, according to an embodiment of the present invention, the signal pad 1110 is constituted as a multi-layer made of the first line 1112 and the second line 1116, whereby an area where the signal pad 1110 is connected with the flexible circuit film 1400 is increased.

Also, a connection electrode 1300 is formed at one edge side of the signal pad 1110 to improve the connection property between the signal pad 1110 and the flexible circuit film 1400. In this instance, signal pads 1110 are connected with a plurality of connection electrodes 1300 in a one-to-one manner. That is, one signal pad 1110 and one connection electrode 1300 are connected with each other.

The connection electrode 1300 connected with the signal pad 1110 is formed on ends of the first substrate 1100 and the second substrate 1200. The connection electrode 1300 is formed in contact with each end of the first substrate 1100 and the second substrate 1200, at which the signal pad 1110 is formed, and at the same time is directly connected with one side of the signal pad 1110. Also, the connection electrode 1300 may be made of, but not limited to, Ag having an excellent conductivity.

In addition, as shown in FIG. 3A, adhesive layer 1350 is arranged between the connection electrode 1300 and the flexible circuit film 1400 to attach the flexible circuit film 1400 to the connection electrode 1300. Because the adhesive layer 1350 is provided with conductive balls, the connection electrode 1300 is electrically connected with the flexible circuit film 1400 through the conductive balls.

Further, as shown, the flexible circuit film 1400 is not formed on the first substrate 1100 but rather is arranged at the edge sides of the first substrate 1100 and the second substrate 1200. That is, the flexible circuit film 1400 is attached to the edge sides of the first substrate 1100 and the second substrate 1200 in a manner of side bonding.

Also, the printed circuit board 1500 is connected to the flexible circuit film 1400. A chip such as a driving integrated circuit may be formed on the flexible circuit film 1400 to constitute a chip on film (COF) structure. However, the present invention is not limited to the COF structure. Also, a lead line is provided on the flexible circuit film 1400, and is connected with the connection electrode 1300 through the conductive ball of the adhesive layer 1350.

The printed circuit board 1500 applies various signals to the display panel through the flexible circuit film 1400. A timing controller, various power circuits, or a memory device may be packaged on the printed circuit board 1500.

The adhesive layer 1350 is formed on the edge sides of the first substrate 1100 and the second substrate 1200. As discussed above, the adhesive layer 1350 may include a plurality of conductive balls.

The adhesive layer 1350 is formed on the edge side of the first substrate 1100 and the edge side of the second substrate 1200. At least one of the plurality of conductive balls is in contact with each of the plurality of connection electrodes 1300.

The flexible circuit film 1400 is formed on the adhesive layer 1350. The lead line is formed on the surface of the flexible circuit film 1400, which faces the adhesive layer 1350. The lead line is electrically connected with the connection electrode 1300 through the conductive ball. That is, one side of the conductive ball is in contact with the connection electrode 1300, and the other side of the conductive ball is in contact with the lead line. The printed circuit board 1500 is also formed on the flexible circuit film 1400.

According to an embodiment of the present invention, the signal pad 1110 is electrically connected with the printed circuit board 1500 through the connection electrode 1300, the conductive ball and the lead line. According to an embodiment of the present invention, the signal pad 1110 includes the first line 1112 and the second line 1116, whereby a wide contact area with the connection electrode 1300 is formed. Therefore, an electrical connection between the signal pad 1110 and the connection electrode 1300 is excellent and physical adhesion therebetween is excellent, whereby a connection defect caused by edge side processing of the display panel is reduced.

Also, the connection electrode 1300 is connected with the signal pad 1110 at the edge side of each of the first substrate 1100 and the second substrate 1200, and the flexible circuit film 1400 is attached to the connection electrode 1300, whereby the first substrate 1100 does not extend more than the second substrate 1200 to expose the upper surface of the signal pad 1100. Therefore, according to an embodiment of the present invention, a bezel area is reduced as compared with the related art.

Also, because one end and the other end of the first substrate 1100 are matched with those of the second substrate 1200, a step difference is prevented from being generated in the bezel area. Particularly, because the signal pad 1110 includes the first line 1112 and the second line 1116 to form a wide contact area, an electrical connection and physical adhesion can be improved even though an edge side bonding contact structure is used.

Hereinafter, the display device according to an embodiment of the present invention is applied to the liquid crystal display device. In particular, FIG. 4 is a cross-sectional view illustrating a display device according to an embodiment of the present invention.

Figure 4:
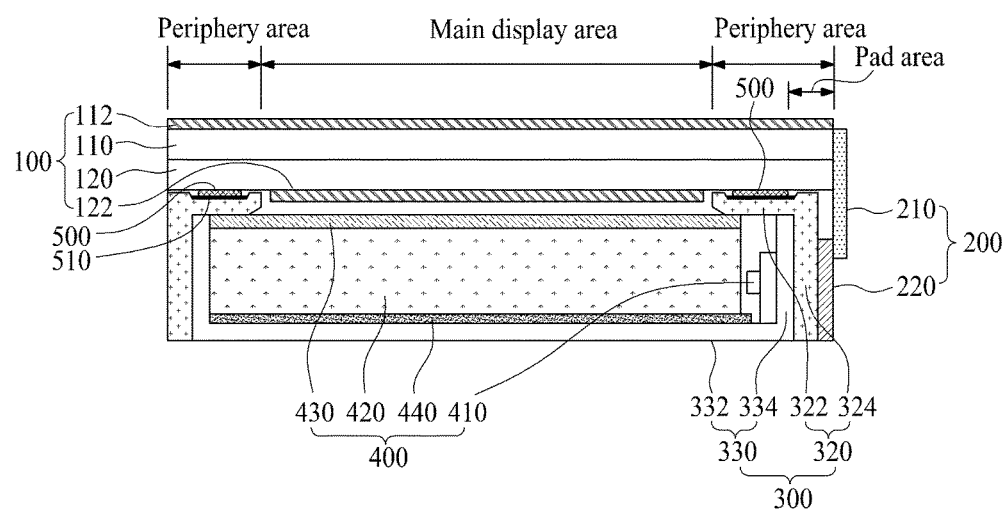
FIG. 4 is a cross-sectional view illustrating a liquid crystal display device according to an embodiment of the present invention.

Referring to FIG. 4, the display device includes a display panel 100, a panel driver 200, a support member 300, a backlight unit 400, and a coupling member 500. The display panel 100 includes an upper substrate 110, an upper polarizer 112, a lower substrate 120, a lower polarizer 122, and a liquid crystal layer formed between the upper substrate 110 and the lower substrate 120.

Further, the upper polarizer 112 is formed on the upper substrate 110, and the lower polarizer 122 is formed below the lower substrate 120. Transmittance of light is controlled by combination of the upper polarizer 112 and the lower polarizer 122, whereby an image is displayed. In addition, a retarder film applied onto the upper polarizer 112 to convert a two-dimensional image to a three-dimensional image may additionally be formed.

The panel driver 200 includes a circuit film 210 and a printed circuit board (PCB) 220. The panel driver 200 is bonded from the edge side of the display panel 100 in a manner of edge side bonding as described above. Also, the support member 300 serves as an external cover while supporting the display panel 100, the panel driver 200 and the backlight unit 400. In more detail, the support member 300 includes a guide frame 320, and a support case 330.

The guide frame 320 guides the position of the backlight unit 400 and supports the display panel 100. As shown, the guide frame 320 includes a first support 322 and a second sidewall 324.

The first support 322 and the second sidewall 324 of the guide frame 320 may be made from polycarbonate, aluminum, SUS, and EGI. However, if the guide frame 320 is made of aluminum 6063 (Al 6063), the guide frame 320 is lightweight and economical and has an excellent radiating property.

If aluminum 6063 is selected as a material of the guide frame 320, because a high surface area may be obtained, a deposited area of the coupling member 500 is increased, whereby a coupling force between the display panel 100 and the guide frame 320 is increased. However, if aluminum 6063 as a material of the guide frame 320 has migration, an adhesion of the coupling member 500 is deteriorated. Therefore, a hydrophilic layer 510 may be formed above the first support 322 to obtain adhesion of the coupling member 500 with respect to the guide frame 320. In more detail, NaOH (aq) cleaning is applied to the surface of the first support 322 and then the surface of the first support 322 may be hydrophilic-treated.

The first support 322 supports the lower surface of the display panel 100, especially a lower edge of the lower substrate 120, and the second sidewall 324 is extended from the first support 322 and guides the position of the backlight unit 400 together with the support case 330. The first support 322 is also provided with the hydrophilic layer 510 on its surface to improve adhesion with the coupling member 500 as described above. The printed circuit board (PCB) 220 of the panel driver 200 can also be fixed to the second sidewall 324 by a double-sided adhesive.

Figure 5:
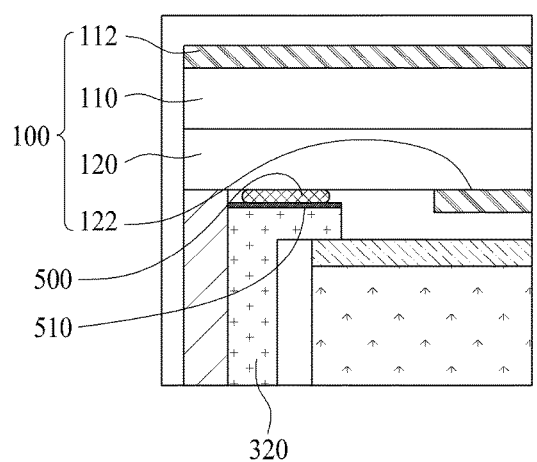
FIG. 5 is a cross-sectional view partially illustrating a display device according to another embodiment of the present invention.

In addition, the first support 322 is designed to have a narrow width for a narrow bezel design as shown in FIG. 5.

In this instance, the coupling member 500 can be deposited on the entire upper surface of the first support 322 to increase a coupling force.

In addition, the support case 330 supports the backlight unit 400 while guiding the position of the backlight unit 400. To this end, the support case 330 includes a second support 332 and a third sidewall 334. The second support 332 supports the lower surface of the backlight unit 400, and the third sidewall 334 is extended from the second support 332 and guides the position of the backlight unit 400 while facing the end of the backlight unit 400.

Also, the support case 330 uniformly transfers and discharges heat generated from the backlight unit 400. That is, because heat is generated from the backlight unit 400, a radiator is required to discharge heat generated from the backlight unit 400. Therefore, if the support case 330 is formed of a material such as metal that enables heat conduction, heat generated from the backlight unit 400 can be discharged while being transferred through the support case 330. The support case 330 can also be omitted.

As described above, coupling between the guide frame 320 constituting the support member 300 and the support cases 330 can be performed using a double-sided adhesive, or using hook coupling based on a groove and a protrusion. Also, coupling between the guide frame 320 constituting the support member 300 and the support cases 330 can be secured using a bolt and a nut.

Further, the backlight unit 400 is arranged below the display panel 100 to supply light to the display panel 100, and its position is guided by the guide frame 320 and the support case 330. The backlight unit 400 may be provided in a direct type and an edge type, where the direct type directly transfers light emitted from a light source to the display panel 100 by arranging the light source on the entire lower surface of the display panel 100, and the edge type transfers light emitted from the light source to the display panel 100 through a light guide plate by arranging the light source at one end below the display panel 100. As shown in FIG. 4, the backlight unit 400 includes a light source 410, a light guide plate 420, an optical sheet 430, and a reflective plate 440.

The light source 410 is arranged to face the end of the light guide plate 420, and the light emitted from the light source 410 enters the light guide plate 420 and then its path is changed toward the display panel 100. A light emitting diode or a fluorescent lamp may be used as the light source 410. The light source 410 may also be mounted on a sidewall, such as the third sidewall 334 of the support member 300 or the second sidewall 324 of the guide frame 320.

In addition, the light guide plate 420 changes the path of the light emitted from the light source 410 toward the display panel 100. For such a change of the light path, various grooves or protrusion patterns are formed in the light guide plate 420.

The optical sheet 430 is also formed on the light guide plate 420 to uniformly supply light to the display panel 100, and may be a combination of a diffusion sheet and a prism sheet. Further, the reflective plate 440 is formed below the light guide plate 420 and upwardly reflects light leaking below the light guide plate 420 to improve the light efficiency.

The coupling member 500 couples the display panel 100 with the support member 300. In more detail, the coupling member 500 is formed between the display panel 100 and the guide frame 320, and couples the display panel 100 to the guide frame 320 to prevent the display panel 100 from being upwardly detached.

In addition, the coupling member 500 is a liquid adhesive, and an elastic resin may be used as the coupling member 500. For reference, if a width of a bezel area becomes very narrow like a borderless type display device, a foam pad tape or acryl tape, which is widely used as a coupling member in the related art, has low reliability due to a narrow attachment area. However, according to an embodiment of the present invention, after the hydrophilic layer 510 is provided in the first support 322 of the guide frame 320 as described above, the liquid adhesive is deposited on the hydrophilic layer 510 and then hardened to couple the display panel 100 with the support member 300.

Figure 6:
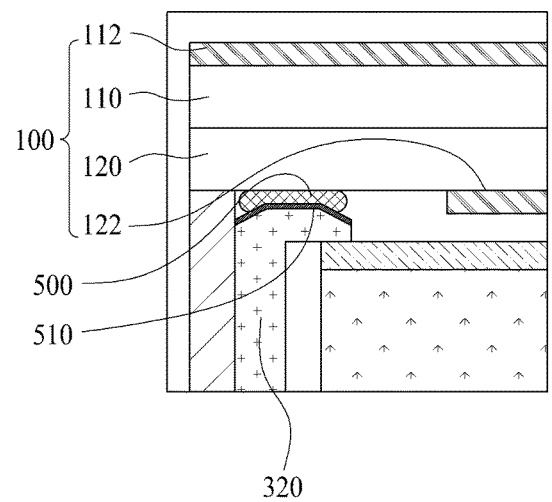
FIG. 6 is a cross-sectional view partially illustrating a display device according to another embodiment of the present invention.

Further, the first support 322 may be provided with an inclined portion at one end or both ends, as shown in FIG. 6, to increase a deposited area of the hydrophilic layer 510. As the deposited area of the hydrophilic layer 510 is increased, more liquid adhesive can be deposited on the hydrophilic layer 510. Therefore, even though the width of the bezel area becomes very narrow, the coupling member 500 can couple the display panel 100 with the support member 300.

In addition, the lower polarizer 122 of the display panel 100 is not formed in the area where the coupling member 500 is formed. Therefore, thickness increase of the display device caused as the coupling member 500 is additionally provided can be avoided. That is, the coupling member 500 is formed between the lower substrate 120 and the first support 322 of the guide frame 320, whereby the thickness increase of the display device caused as the coupling member 500 is additionally provided can be avoided.

Hereinafter, a method for treating a hydrophilic surface of the guide frame 320 according to an embodiment of the present invention will be described in more detail. As described above, the guide frame may be made of any one of polycarbonate, aluminum, SUS, and EGI. For reference, adhesion is high in the order of EGI, polycarbonate, SUS, and aluminum during substrate bonding based on the liquid adhesive (elastic resin).

In the present invention, aluminum 6063 is used as the guide frame to enhance a bonding force of the substrate even in a design condition of a very narrow bezel size. Instead, the hydrophilic layer 510 is formed on the guide frame to improve adhesion between the aluminum 6063 and the liquid adhesive.

In more detail, —OH is applied to the surface of the guide frame by NaOH(aq) cleaning when the hydrophilic layer 510 is formed. It is preferable that the hydrophilic layer 510 includes NaOH component at a concentration of 5 wt % or less. A method for forming the hydrophilic layer 510 may include a method for plasma treatment, which may clean a contaminated surface, in addition to a NaOH(aq) cleaning method, where hydrophilic surface modification may be used, and an anchoring effect is improved to obtain a wide surface area.

As a surface treatment method, a general hydrophilic surface modification method may be used such as plasma treatment, which may give polarity to a non-polar surface and clean the non-polar surface, as well as NaOH aqueous solution treatment as chemical surface treatment, whereby an anchoring effect can be improved to obtain a wide surface area. Also, the hydrophilic layer 510 may be formed through a process of applying a component having high electronegativity such as O to the surface of the guide frame.

As described above, because the panel driver is attached onto the lower surface of the upper substrate, the panel driver is not exposed to the front surface of the display device, whereby a separate case is not required to be formed on the upper surface to cover the panel driver as in the related art. Therefore, according to an embodiment of the present invention, the thickness of the display device may be reduced, and a front step difference of the display device may be removed, whereby esthetic design effect may be obtained, in which the front surface of the display device is recognized as one structure. Also, in an embodiment of the present invention, the hydrophilic thin film is formed on the surface of the guide frame, and an elastic resin is used as the coupling member, whereby the display panel can be stably coupled to the guide frame even when the display device is designed to have a very narrow bezel area.

Figure 7:
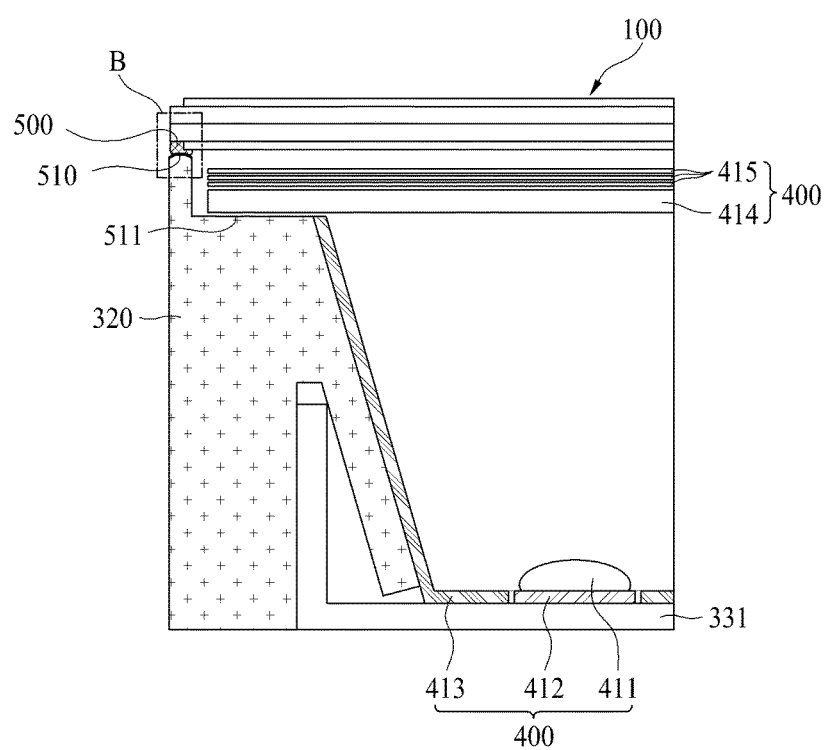
FIG. 7 is a cross-sectional view partially illustrating a display device according to another embodiment of the present invention.
Figure 8:
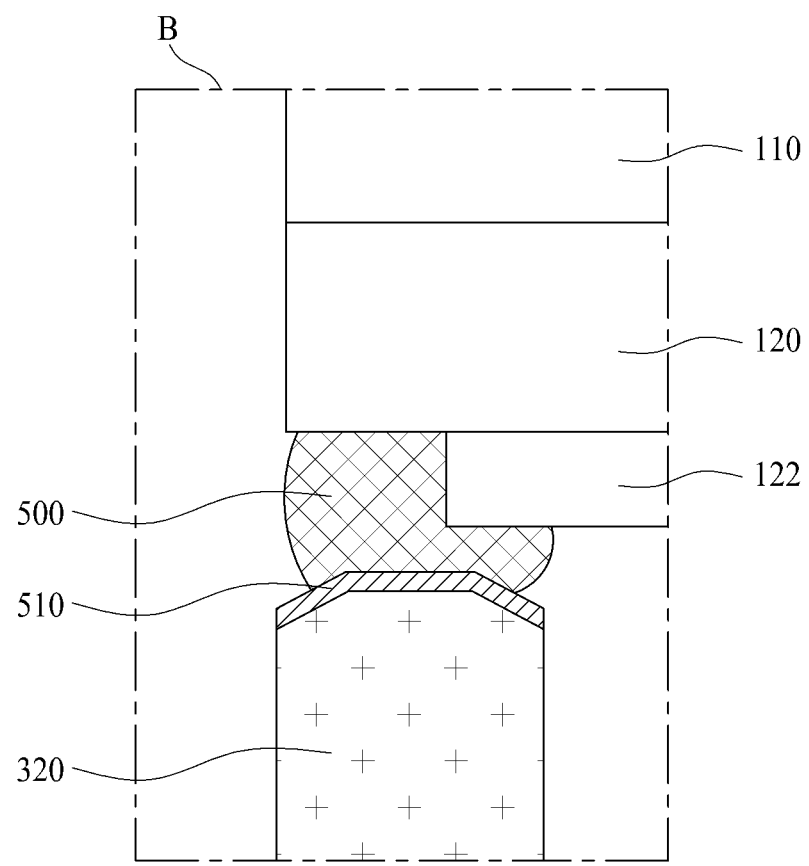
FIG. 8 is an enlarged view of an area B shown in FIG. 7 according to an embodiment of the present invention.

Next, FIG. 7 is a cross-sectional view illustrating a display device according to another embodiment of the present invention, and FIG. 8 is an enlarged view of an area B shown in FIG. 7. Referring to FIGS. 7 and 8, the display device according to another embodiment of the present invention includes a direct type backlight unit 400 unlike the aforementioned embodiment. Hereinafter, only elements different from those of the aforementioned embodiment will be described. As in the display device of FIG. 4, the panel driver 200 includes a circuit film 210 and a printed circuit board (PCB) 220. The panel driver 200 is also bonded to an edge side of the display panel 100 in a manner of edge side bonding as described above.

As shown, the display device includes a cover bottom 331, a guide frame 320 arranged at an edge area of the display panel 100, and a display panel 100 supported by the guide frame 320. The cover bottom 331 supports the backlight unit 400 and serves as a casing of the lower portion of the display panel. Further, the cover bottom 331 includes a bottom surface on which light sources 411 and 412 of the backlight unit 400 are disposed, and a sidewall bent at an edge area of the bottom surface and secured with the guide frame 320.

Figure 9:
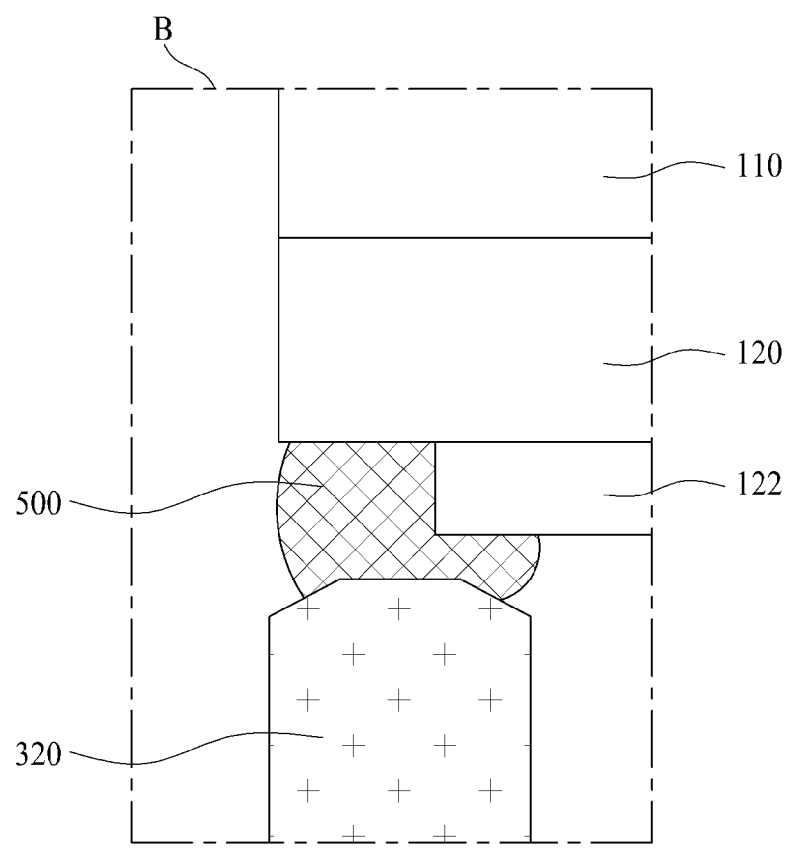
FIG. 9 is an enlarged view of an area B according to another embodiment of the present invention.

The guide frame 320 guides the position of the backlight unit 400, supports the display panel 100 and includes a hydrophilic layer 510 on an upper surface of the sidewall that supports the display panel 100 in the same manner as the aforementioned embodiment. Referring to FIG. 8, the guide frame 320 may be provided with an inclined surface at one end or both ends to increase a deposited area (or formation area) of the hydrophilic layer 510. The hydrophilic layer 510 can also be omitted, as shown in FIG. 9.

Figure 10:
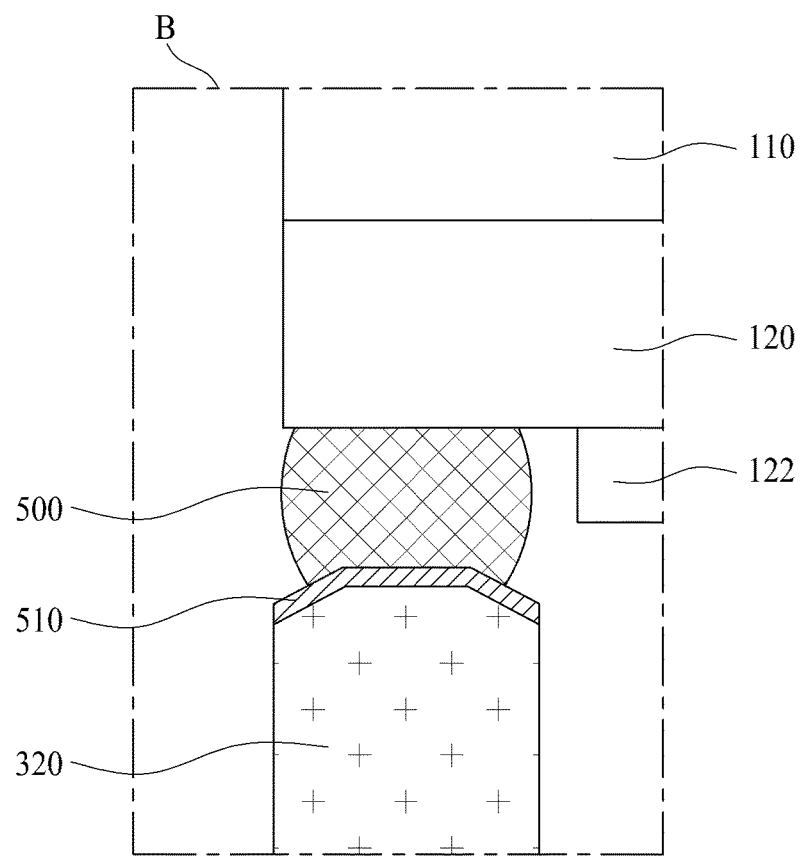
FIG. 10 is an enlarged view of an area B according to another embodiment of the present invention.

A coupling member 500 for attaching the display panel 100 to the guide frame 320 is arranged on the hydrophilic layer 510. The coupling member 500 is a liquid adhesive, and an elastic resin may be used as the coupling member 500. The lower polarizer 122 of the display panel 100 may be not formed in the area where the coupling member 500 is formed, as shown in FIG. 10.

Also, the backlight unit 400 includes light sources 411 and 412, a reflective sheet 413, a diffuser 414, and a plurality of optical sheets 415.

In more detail, the backlight unit 400 includes light sources 411 and 412 deposited on the cover bottom 331, a reflective sheet 413 arranged on the bottom surface of the cover bottom 331 and inside a sidewall of the guide frame 320, a diffuser 414 arranged between the light sources 411 and 412 and the display panel 100 by being supported by the guide frame 320, and a plurality of optical sheets 415 arranged on the diffuser 414.

The light sources 411 and 412 are disposed on the cover bottom 331 and include a printed circuit board 412, and a plurality of LEDs 411 packaged on the printed circuit board 412, emitting light. The reflective sheet 413 is arranged on the bottom surface of the cover bottom 331 and inside the sidewall of the guide frame 320 to improve light efficiency. The reflective sheet 413 may include a plurality of holes that expose the light sources 411 and 412.

The diffuser 414 is arranged between the light sources 411 and 412 and the display panel 100 by being supported by the guide frame 320. The diffuser 414 may also be supported by a raised spot 511 provided at the sidewall of the guide frame 320. That is, the sidewall of the guide frame 320 includes a first raised spot 511 for supporting the diffuser 414 and a second raised spot arranged to be higher than the first raised spot 511 and doped with the hydrophilic layer 510 to support the display panel 100. In this instance, the width of the second raised spot may be designed to be narrower than that of the first raised spot.

Figure 11:
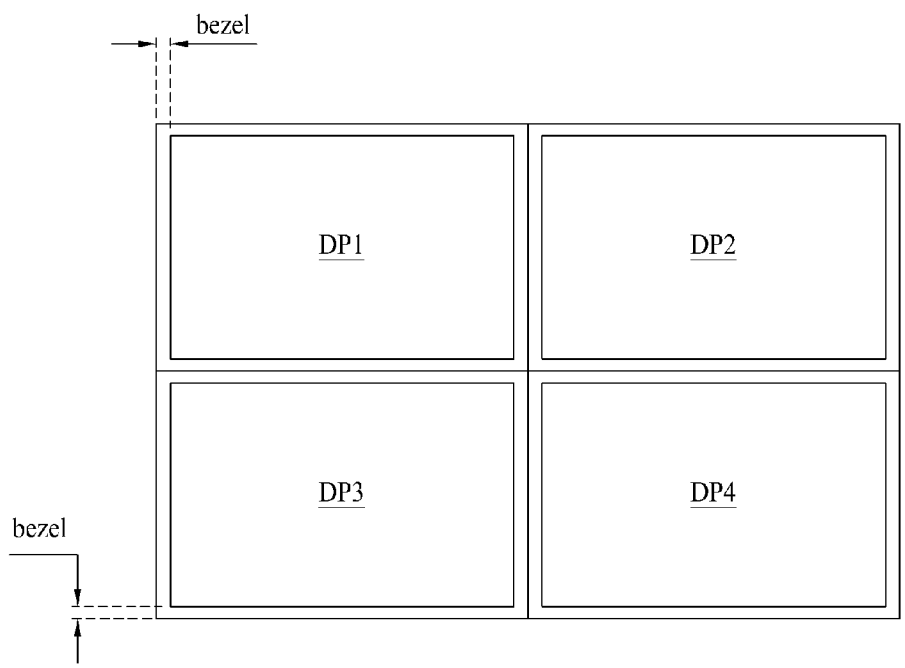
FIG. 11 illustrates that a display device according to an embodiment of the present invention arranged in a tile pattern constitutes a video wall display device.

Next, FIG. 11 illustrates that a display device arranged in a tile pattern constitutes a video wall display device. An example shown in FIG. 11 illustrates that four (4) display devices DP1 to DP4 according to an embodiment of the present invention are arranged in a tile pattern of 2×2 to constitute a video wall display device 2000.

When the video wall display device 2000 is formed with a combination of the display devices DP1 to DP4, an esthetic appearance of the video wall display device is deteriorated if a bezel of each of the display devices DP1 to DP4 is increased. Particularly, intervals among the display devices DP1 to DP4 become wide, whereby an image is not displayed smoothly, and the display quality is deteriorated.

Edge side bonding may be applied to the display device according to an embodiment of the present invention as described above to reduce a bezel, whereby esthetic appearance is improved when the display device is applied to the video wall display device 2000. Also, because the intervals among the display devices DP1 to DP4 may be formed to become narrow, an image can be displayed smoothly, and the display quality of the video wall display device 2000 is improved.

In the present invention as described above, because the connection electrode is connected with one end of the pad at ends of the first substrate and the second substrate and therefore the flexible circuit film may be arranged at ends of the first substrate and the second substrate, the first substrate is not required to be more extended than the second substrate to externally expose the upper surface of the pad as in the related art. Therefore, the bezel area is reduced as compared to the related art.

Also, because one end and the other end of the first substrate are matched with those of the second substrate, a step difference is prevented from being generated in the bezel area. Also, because the connection electrode is connected with the signal pad at each edge side of the first substrate and the second substrate and the flexible circuit film is arranged at the ends of the first substrate and the second substrate, the first substrate is not required to be more extended than the second substrate to externally expose the upper surface of the signal pad as in the related art.

Further, because the signal pad is connected with the connection electrode by an edge side bonding manner, the bezel area is reduced as compared with the related art. Also, because the signal pad includes a first line, a second line and a third line to form a wide contact area, electrical connection property and physical adhesion may be improved even when the edge side bonding contact structure is used. The edge side bonding manner is applied to the display device of the present invention to reduce the bezel, whereby esthetic appearance is improved when the display device is applied to the video wall display device. Because the intervals among the display devices can be narrow, an image can be displayed smoothly, and the display quality of the video wall display device 2000 can be improved. The hydrophilic thin film is also formed on the surface of the guide frame, and an elastic resin is used as the coupling member, whereby the display panel can be stably coupled to the guide frame even when the display device is designed to have a very narrow bezel area.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

What is claimed is:

1. A display device comprising:
   a display panel including a first substrate and a second substrate;
   a panel driver electrically connected to the display panel;
   a guide frame arranged at an edge area of the display panel and including a support to support the display panel;
   a coupling member arranged on an upper surface of the support and configured to couple the display panel to the support; and
   a plurality of connection electrodes electrically connected to the display panel and the panel driver,
   wherein the first substrate includes a plurality of signal pads at a first end area of the first substrate,
   wherein the plurality of connection electrodes are electrically connected to the plurality of signal pads of the first substrate respectively,
   wherein the plurality of connection electrodes are in contact with a side surface of the plurality of signal pads of the first substrate respectively, and
   wherein the plurality of connection electrodes are in contact with a side surface of the first substrate.

2. The display device of claim 1, further comprising a cover bottom.

3. The display device of claim 2, further comprising a backlight unit supported by the cover bottom and configured to emit light towards the display panel.

4. The display device of claim 3, wherein the backlight unit includes a plurality of light sources disposed on the cover bottom.

5. The display device of claim 4, wherein the plurality of light sources are light emitting diodes.

6. The display device of claim 1, wherein the upper surface of the support is provided with an inclined portion at one or both ends of the upper surface.

7. The display device of claim 1, wherein a side of the display panel includes a display area, and wherein the panel driver is bonded to an edge side of the display panel, which is a side of the display panel that does not include the display area, the panel driver thereby being side bonded.

8. The display device of claim 7, wherein the panel driver includes a circuit film and a printed circuit board, and
wherein the circuit film is bonded to the edge side of the display panel and the printed circuit board is connected to the circuit film.

9. The display device of claim 7,
wherein the display panel has a pad area,
wherein the pad area includes the plurality of signal pads and the plurality of connection electrodes,
wherein at least one of the plurality of signal pads includes a first line and a second line which are arranged on surfaces of the first substrate and the second substrate in the pad area, and
wherein at least one of the plurality of connection electrodes is formed in contact with sides of the first substrate and the second substrate that are located at the edge side of the display panel, and an end of the first line, and end of the second line, and the panel driver are attached to the connection electrode.

10. The display device of claim 9, wherein the panel driver is bonded to the connection electrode by an adhesive layer.

11. The display device of claim 10, wherein the adhesive layer includes a conductive ball in order to electrically connect the connection electrode and the panel driver.

12. The display device of claim 9, wherein the first line of the signal pad has a greater thickness than the second line of the signal pad.

13. The display device of claim 1, wherein the guide frame is made of an aluminum alloy.

14. The display device of claim 1, wherein the guide frame is made of polycarbonate.

15. The display device of claim 1, wherein the coupling member is an elastic resin.

16. The display device of claim 1, wherein the display panel includes a lower polarizer formed below the second substrate, and wherein the coupling member is adhered to the second substrate in an area where the lower polarizer is not formed.

17. The display device of claim 1, wherein the display panel includes a liquid crystal layer.

18. The display device of claim 1, further comprising a hydrophilic layer on the upper surface of the support.

* * * * *